US011831930B2

(12) United States Patent
Grover

(10) Patent No.: US 11,831,930 B2
(45) Date of Patent: *Nov. 28, 2023

(54) CONTENT-MODIFICATION SYSTEM WITH ADVERTISEMENT RECONCILIATION FEATURE

(71) Applicant: Roku, Inc., San Jose, CA (US)

(72) Inventor: Matthew Grover, Cardiff (GB)

(73) Assignee: ROKU, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/101,766

(22) Filed: Jan. 26, 2023

(65) Prior Publication Data

US 2023/0232053 A1    Jul. 20, 2023

Related U.S. Application Data

(63) Continuation of application No. 17/361,885, filed on Jun. 29, 2021, now Pat. No. 11,601,695.

(Continued)

(51) Int. Cl.
*H04N 21/234* (2011.01)
*H04N 21/258* (2011.01)
*H04N 21/81* (2011.01)

(52) U.S. Cl.
CPC . *H04N 21/23424* (2013.01); *H04N 21/23418* (2013.01); *H04N 21/25883* (2013.01); *H04N 21/812* (2013.01)

(58) Field of Classification Search
CPC .............................................. H04N 21/23424
See application file for complete search history.

(56) References Cited

U.S. PATENT DOCUMENTS 10,373,196 B2    8/2019  Ma et al.
2012/0116883 A1  5/2012  Asam et al.
(Continued)

OTHER PUBLICATIONS

International Search Report and Written Opinion of the International Searching Authority directed to related International Patent Application No. PCT/US2022/015987, dated May 23, 2022; 7 pages.

*Primary Examiner* — Michael H Hong
(74) *Attorney, Agent, or Firm* — Sterne, Kessler, Goldstein and Fox P.L.L.C.

(57) ABSTRACT

In one aspect, a method includes while a first content-presentation device is performing a content-replacement operation in which the first content-presentation device outputs a replacement advertisement segment in place of an advertisement segment, determining, by a computing system, that the advertisement segment is not an expected modifiable advertisement segment. The method also includes in response to determining that the advertisement segment is not the expected modifiable advertisement segment, determining, by the computing system, that the advertisement segment is ineligible for replacement. The method also includes in response to determining that the advertisement segment is ineligible for replacement, causing, by the computing system, at least one content-presentation device to perform, at a subsequent content-replacement opportunity, a corrective content-replacement operation in which the at least one content-presentation device outputs the advertisement segment in place of a subsequent modifiable advertisement segment that the at least one content-presentation device is scheduled to receive.

20 Claims, 10 Drawing Sheets

Related U.S. Application Data

(60) Provisional application No. 63/148,219, filed on Feb. 11, 2021.

(56) References Cited

U.S. PATENT DOCUMENTS

| | | |
|---|---|---|
| 2014/0245342 A1 | 8/2014 | Barsook et al. |
| 2015/0220978 A1* | 8/2015 | Abraham ........... G06Q 30/0251 |
| | | 705/14.49 |
| 2015/0334434 A1 | 11/2015 | Green et al. |
| 2019/0007733 A1 | 1/2019 | Ashbacher |
| 2020/0359080 A1 | 11/2020 | Ashbacher et al. |
| 2020/0404348 A1 | 12/2020 | Merchant et al. |
| 2022/0256211 A1 | 8/2022 | Grover |

* cited by examiner

| Time Period | Content-Distribution System 102 | Content-Presentation Device 104 | Fingerprint-Matching Server 106 | Content-Management System 108 | Data-Management System 110 | Supplemental-Content Delivery System 112 |
|---|---|---|---|---|---|---|
| T1 | Transmit first content on a channel | | | | | |
| T2 | Generate first fingerprint data and first metadata | | | | | |
| T3 | Transmit first fingerprint data and first metadata | | | | | |
| T4 | | Receive second content | | | | |
| T5 | | Generate second fingerprint data and second metadata | | | | |
| T6 | | Transmit second fingerprint data and second metadata | | | | |
| T7 | | | Receive first fingerprint data and first metadata | | | |
| T8 | | | Receive second fingerprint data and second metadata | | | |

Figure 4A

| | | | | | | |
|---|---|---|---|---|---|---|
| T9 | | Compare first fingerprint data and second fingerprint data | | | | |
| T10 | | Detect a match between first fingerprint data and second fingerprint data | | | | |
| T11 | | Identify the channel on which the second content is being received | | | | |
| T12 | | Generate metadata associated with the identified channel | | | | |
| T13 | | Transmit an indication of the identified channel and the associated metadata | | | | |
| T14 | | | | | Receive the indication of the identified channel and the associated metadata | |

Figure 4B

| | | | | | |
|---|---|---|---|---|---|
| T15 | | | | | Determine historical content consumption data |
| T16 | Transmit third content | | | | |
| T17 | Generate third fingerprint data and third metadata | | | | |
| T18 | Transmit third fingerprint data and third metadata | | | | |
| T19 | | | | Receive modifiable content segment | |
| T20 | | | | Generate fourth fingerprint data and fourth metadata | |
| T21 | | | | Transmit fourth fingerprint data and fourth metadata | |
| T22 | | | Receive third fingerprint data and third metadata | | |
| T23 | | | Receive fourth fingerprint data and fourth metadata | | |

Figure 4C

| | | | | | |
|---|---|---|---|---|---|
| T24 | Compare at least a portion of third fingerprint data and at least a portion of fourth fingerprint data | | | | |
| T25 | Detect a match between at least a portion of third fingerprint data and at least a portion of fourth fingerprint data | | | | |
| T26 | Identify an upcoming content modification opportunity on the identified channel | | | | |
| T27 | Transmit the third fingerprint data and the third metadata | | | | |
| T28 | | Receive third fingerprint data and third metadata | | | |
| T29 | | Receive fifth content | | | |
| T30 | | Output for presentation fifth content | | | |

Figure 4D

|  |  |  |  |  |  |  |
|---|---|---|---|---|---|---|
| T31 | Generate fifth fingerprint data and fifth metadata |  |  |  |  |  |
| T32 | Compare the third fingerprint data and the fifth fingerprint data |  |  |  |  |  |
| T33 | Detect a match between the third fingerprint data and the fifth fingerprint data |  |  |  |  |  |
| T34 | Determine modification start time and modification end time |  |  |  |  |  |
| T35 | Transmit a request for supplemental content |  |  |  |  |  |
| T36 |  |  | Receive request and select supplemental content |  |  |  |
| T37 |  |  | Transmit request for link |  |  |  |
| T38 |  |  |  |  |  | Transmit link |

Figure 4E

| T39 | | | Transmit link | | |
|---|---|---|---|---|---|
| T40 | Receive link and retrieve supplemental content | | | | |
| T41 | Perform content modification operation | | | | |

Figure 4F

CONTENT-MODIFICATION SYSTEM WITH ADVERTISEMENT RECONCILIATION FEATURE

CROSS-REFERENCE TO RELATED APPLICATIONS

This application is a continuation of U.S. Non-Provisional patent application Ser. No. 17/361,885, titled "CONTENT-MODIFICATION SYSTEM WITH ADVERTISEMENT RECONCILIATION FEATURE" filed Jun. 29, 2021, which claims the benefit of U.S. Provisional Application 63/148,219, filed Feb. 11, 2021. The entire disclosures of both are incorporated herein by reference.

USAGE AND TERMINOLOGY

In this disclosure, unless otherwise specified and/or unless the particular context clearly dictates otherwise, the terms "a" or "an" mean at least one, and the term "the" means the at least one.

In this disclosure, the term "computing system" means a system that includes at least one computing device. In some instances, a computing system can include one or more other computing systems.

SUMMARY

In one aspect, a method includes while a first content-presentation device is performing a content-replacement operation in which the first content-presentation device outputs a replacement advertisement segment in place of an advertisement segment, determining, by a computing system, that the advertisement segment is not an expected modifiable advertisement segment. The method also includes in response to determining that the advertisement segment is not the expected modifiable advertisement segment, determining, by the computing system, that the advertisement segment is ineligible for replacement. The method also includes in response to determining that the advertisement segment is ineligible for replacement, causing, by the computing system, at least one content-presentation device to perform, at a subsequent content-replacement opportunity, a corrective content-replacement operation in which the at least one content-presentation device outputs the advertisement segment in place of a subsequent modifiable advertisement segment that the at least one content-presentation device is scheduled to receive.

In another aspect, a non-transitory computer-readable storage medium has stored thereon program instructions that, upon execution by a processor, cause performance of a set of operations. The set of operations includes while a first content-presentation device is performing a content-replacement operation in which the first content-presentation device outputs a replacement advertisement segment in place of an advertisement segment, determining that the advertisement segment is not an expected modifiable advertisement segment. The set of operations also includes in response to determining that the advertisement segment is not the expected modifiable advertisement segment, determining that the advertisement segment is ineligible for replacement. The set of operations also includes in response to determining that the advertisement segment is ineligible for replacement, causing at least one content-presentation device to perform, at a subsequent content-replacement opportunity, a corrective content-replacement operation in which the at least one content-presentation device outputs the advertisement segment in place of a subsequent modifiable advertisement segment that the at least one content-presentation device is scheduled to receive.

In another aspect, a computing system includes a processor and a non-transitory computer-readable storage medium, having stored thereon program instructions that, upon execution by the processor, cause performance of a set of operations. The set of operations includes while a first content-presentation device is performing a content-replacement operation in which the first content-presentation device outputs a replacement advertisement segment in place of an advertisement segment, determining that the advertisement segment is not an expected modifiable advertisement segment. The set of operations also includes in response to determining that the advertisement segment is not the expected modifiable advertisement segment, determining that the advertisement segment is ineligible for replacement. The set of operations also includes in response to determining that the advertisement segment is ineligible for replacement, causing at least one content-presentation device to perform, at a subsequent content-replacement opportunity, a corrective content-replacement operation in which the at least one content-presentation device outputs the advertisement segment in place of a subsequent modifiable advertisement segment that the at least one content-presentation device is scheduled to receive.

BRIEF DESCRIPTION OF THE DRAWINGS

FIGS. 4A, 4B, 4C, 4D, 4E, and 4F collectively make up a table showing example time-periods and corresponding operations that can be performed in connection with the example content-modification system.

DETAILED DESCRIPTION

I. Overview

Figure 1:
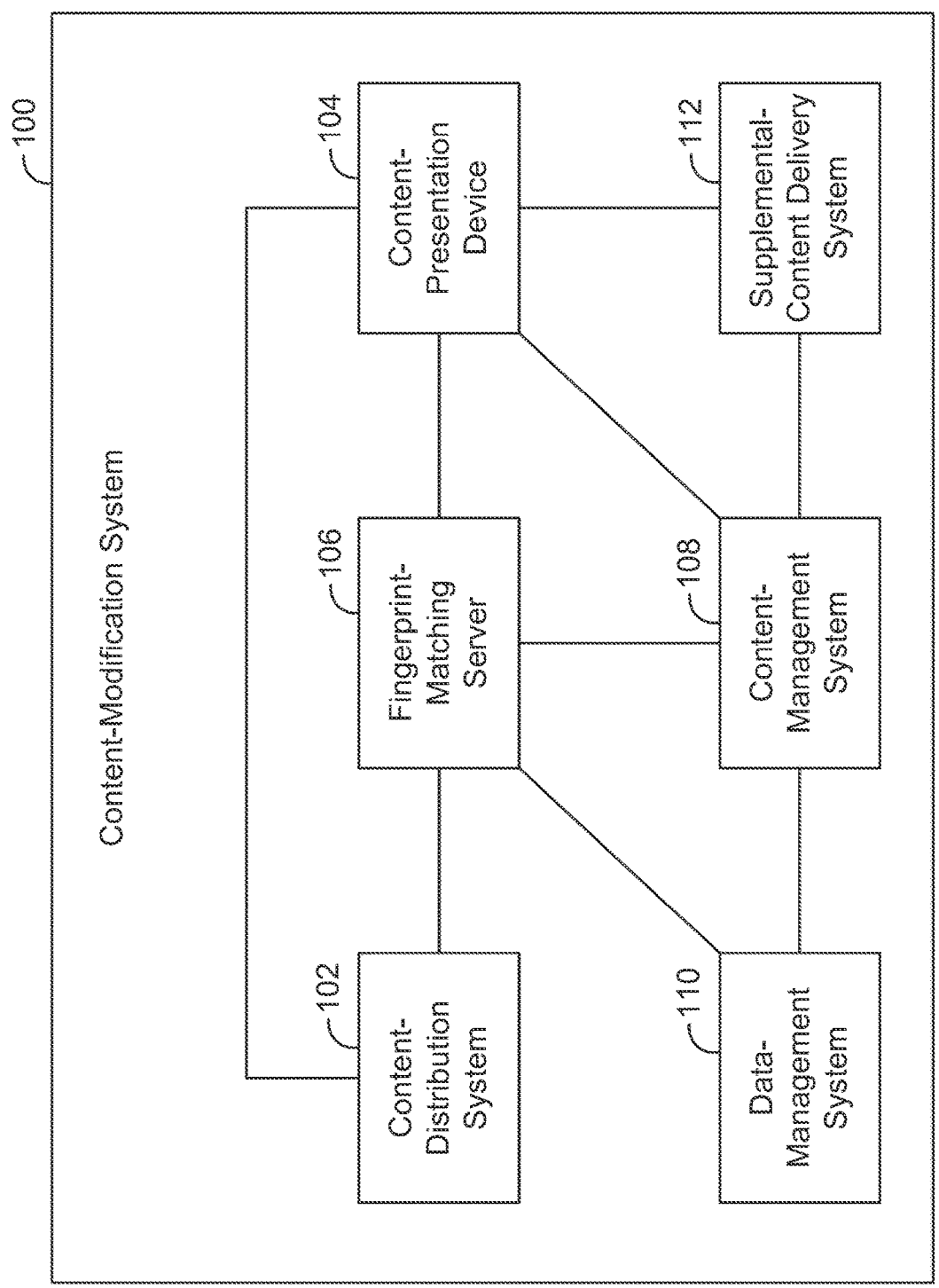
FIG. 1 is a simplified block diagram of an example content-modification system in which various described principles can be implemented.

To deliver and present content to end-users, a content provider can transmit the content to one or more content-distribution systems, each of which can in turn transmit the content to one or more respective content-presentation devices to be output for presentation to respective end-users. Such a hierarchical arrangement can facilitate convenient, widespread distribution of content.

By way of example, in order for a video content provider to deliver video content to end-users throughout the United States, the video content provider can transmit the video content by satellite or another medium to content-distribution systems that serve respective designated market areas (DMAs) within the United States. Each such content-distribution system can therefore receive the national satellite feed carrying the video content and can transmit the video content to television sets and/or set-top boxes in the content-distribution system's DMA, such that the video content can be output for presentation to respective end-users in that DMA. In practice, these content-distribution systems and their means of transmission to content-presentation devices can take various forms. For instance, a content-distribution system can be associated with a cable-television provider and can transmit video content to content-presentation devices of end-users who are cable-television subscribers through hybrid fiber/coaxial cable connections.

As such, in various scenarios, a content-distribution system can transmit content to a content-presentation device, which can receive and output the content for presentation to an end-user. In some situations, even though the content-presentation device receives content from the content-distribution system, it can be desirable for the content-presentation device to perform a content-modification operation so that the content-presentation device can output for presentation alternative content instead of at least a portion of that received content.

For example, in the case where the content-presentation device receives a linear sequence of content segments that includes a given advertisement segment positioned somewhere within the sequence, it can be desirable for the content-presentation device to replace the given advertisement segment with a different advertisement segment that is perhaps more targeted to the end-user (e.g., more targeted to the end-user's interests, demographics, etc.). This type of advertisement replacement is also referred to herein as "dynamic ad insertion (DAI)." As another example, it can be desirable for the content-presentation device to overlay on the given advertisement segment, overlay content that enhances the given advertisement segment in a way that is again perhaps more targeted to the end-user. The described content-modification system can facilitate providing these and other related features.

In one example, the content-modification system can include a fingerprint-matching server that can identify an upcoming content-modification opportunity on an identified channel, which it can do by comparing and detecting a match between two different instances of fingerprint data. Based on the detected match, the fingerprint-matching server can then transmit fingerprint data and metadata to the content-presentation device data to facilitate preparing the content-presentation device to perform a content-modification operation in connection with the identified upcoming content-modification opportunity.

However, in other cases, it may be desirable for the content-presentation device to use one or more alternative techniques to facilitate performing a content-modification operation.

For example, the fingerprint-matching server can use broadcast-schedule data to facilitate the content-presentation device performing a content-modification operation. Among other things, this can allow the content-presentation device to facilitate performing a content-modification operation without using fingerprint data or by using fingerprint data in a more limited fashion. This can be beneficial in the case where the content-presentation device does not receive or otherwise have access to fingerprint data, or where the use of fingerprint data is undesirable for one or more reasons (e.g., because fingerprint-based techniques may be computationally expensive).

In a situation where a content-presentation device is scheduled to receive a content segment, the fingerprint-matching server can use fingerprint matching or other automatic content recognition techniques to determine that the content segment is a particular modifiable content-segment that has been designated as a candidate for replacement. Thus, in accordance with an upcoming content-modification opportunity, the content-presentation device can be scheduled to replace that particular modifiable content-segment (e.g., an advertisement) with supplemental content (e.g., a replacement advertisement) at a modification start-time. In this context, a particular modifiable content-segment that the fingerprint-matching server has identified and is thus expecting the content-presentation device to receive and replace at a content-replacement opportunity will be referred to herein as an "expected modifiable content-segment," or, by way of example, an "expected modifiable advertisement segment."

In some situations, however, the fingerprint-matching server might mistakenly identify the content segment. That is, the fingerprint-matching server might determine that the content segment is the particular modifiable content-segment when, in fact, the content segment is a different content segment. Then, after a short period of time (e.g., at least a few seconds after the modification start-time, and thus after the content-presentation device has already begun replacing the content segment), the fingerprint-matching server might determine that the content segment currently being replaced is not the expected modifiable content-segment.

This can occur in various situations. For example, the first few seconds or more of the content segment being transmitted by the content-distribution system might be the same as the expected modifiable content-segment, but the remainder of the content segment might be different from the expected modifiable content-segment.

As another example, the content-presentation device can be connected to a set-top box (STB) or other type of tuner device that is not part of the content-modification system and is associated with a multi-channel content distributor such as a multi-channel video program distributor (MVPD). With such an arrangement, the STB might replace the expected modifiable content-segment with alternative content before the modification start-time and before the content-presentation device receives the expected modifiable content-segment.

As yet another example, a broadcaster or other entity associated with the content-distribution system can change the broadcast schedule without notifying the fingerprint-matching server or other devices in the content-modification system. For instance, even though the broadcast-schedule data indicates that the content-presentation device is scheduled to receive the expected modifiable content-segment, the content-distribution system may, without updating the broadcast-schedule data or otherwise notifying the content-modification system, broadcast in place of the expected modifiable content-segment a different modifiable content-segment or a content segment that, despite being designated as a candidate for replacement, is currently ineligible for modification. As described in more detail below, a content segment can be designated as ineligible for modification as part of an agreement between a content provider (e.g., an advertiser) and a content distributor, or can be ineligible for modification for other possible reasons.

As a result of determining that the underlying content segment that the content-presentation device received and is currently replacing is not the expected modifiable content-segment, the fingerprint-matching server can responsively instruct the content-presentation device to stop performing (e.g., abort) the content-replacement operation, in order to show as much of the underlying content segment as possible. Alternatively, the content-presentation device itself might stop performing the content-replacement operation without instruction from the fingerprint-matching server. For instance, the content-presentation device might stop performing the content-replacement operation upon determining that the underlying content segment is not the expected modifiable content-segment.

When performance of the content-replacement operation is stopped in either of these manners, the display of the supplemental content might abruptly end after a few seconds or more worth of frames (e.g., half of an advertisement segment duration), and the original underlying content segment might be displayed thereafter. Thus, the content-presentation device stopping performance of the content-modification operation after the content-modification operation has already begun can result in an undesirable user experience.

Partially replacing content segments that were ineligible for replacement and thus should not have been replaced can also be undesirable to content providers. For example, an advertiser might enter into an agreement with a content distributor for the content distributor to show a particular number of impressions of an advertisement segment. Thus, as part of the agreement, the advertisement segment can be designated as ineligible for replacement until the particular number of impressions is reached. However, the issue described above might result in less than the agreed-upon number of impressions being completed. Additionally or alternatively, even in configurations where the content-modification system has instructions to forgo replacing certain advertisement segments (e.g., advertisements for Company X or Product Y) that may be part of a particular advertising campaign, the above-described issue can still cause those advertisement segments to be partially replaced.

The present disclosure provides an improved content-modification system that autonomously reconciles an advertising campaign in the event that a content misidentification has caused an advertisement segment to be partially replaced.

In an example method, while a content-presentation device is replacing an advertisement segment with a replacement advertisement segment, the content-modification system can determine that the advertisement segment is not an expected modifiable advertisement segment and responsively then determine whether the advertisement segment is ineligible for replacement. In response to determining that the advertisement segment is ineligible for replacement, the content-modification system can cause at least one content-presentation device (e.g., the content-presentation device and/or one or more other content-presentation devices) to perform a corrective content-replacement operation using the modifiable advertisement segment. That is, the content-modification system can make up for at least partially replacing the advertisement segment by having at least one content-presentation device output the advertisement segment at a subsequent content-replacement opportunity.

In addition to the corrective content-replacement operation, the content-modification system can also reconcile the advertising campaign in reports sent to the advertiser. For instance, despite the completion of the initial content-replacement operation, the content-modification system can indicate in a report to the advertiser that an impression of the advertisement segment was completed, since the corrective content-replacement operation was performed.

Furthermore, in some situations, to preserve desirable user experience and not abort the replacement partway through, the content-modification system, in response to determining that the advertisement segment is ineligible for replacement, can also cause the content-presentation device to complete performance of the content-replacement operation.

Other operations related to reconciling an advertising campaign are described herein as well.

II. Architecture

A. Content-Modification System

FIG. 1 is a simplified block diagram of an example content-modification system 100. The content-modification system 100 can include various components, such as a content-distribution system 102, a content-presentation device 104, a fingerprint-matching server 106, a content-management system 108, a data-management system 110, and/or a supplemental-content delivery system 112.

The content-modification system 100 can also include one or more connection mechanisms that connect various components within the content-modification system 100. For example, the content-modification system 100 can include the connection mechanisms represented by lines connecting components of the content-modification system 100, as shown in FIG. 1.

In this disclosure, the term "connection mechanism" means a mechanism that connects and facilitates communication between two or more components, devices, systems, or other entities. A connection mechanism can be or include a relatively simple mechanism, such as a cable or system bus, and/or a relatively complex mechanism, such as a packet-based communication network (e.g., the Internet). In some instances, a connection mechanism can be or include a non-tangible medium, such as in the case where the connection is at least partially wireless. In this disclosure, a connection can be a direct connection or an indirect connection, the latter being a connection that passes through and/or traverses one or more entities, such as a router, switcher, or other network device. Likewise, in this disclosure, communication (e.g., a transmission or receipt of data) can be a direct or indirect communication.

The content-modification system 100 and/or components thereof can take the form of a computing system, an example of which is described below.

Notably, in practice, the content-modification system 100 is likely to include many instances of at least some of the described components. For example, the content-modification system 100 is likely to include many content-distribution systems and many content-presentation devices.

B. Computing System

Figure 2:
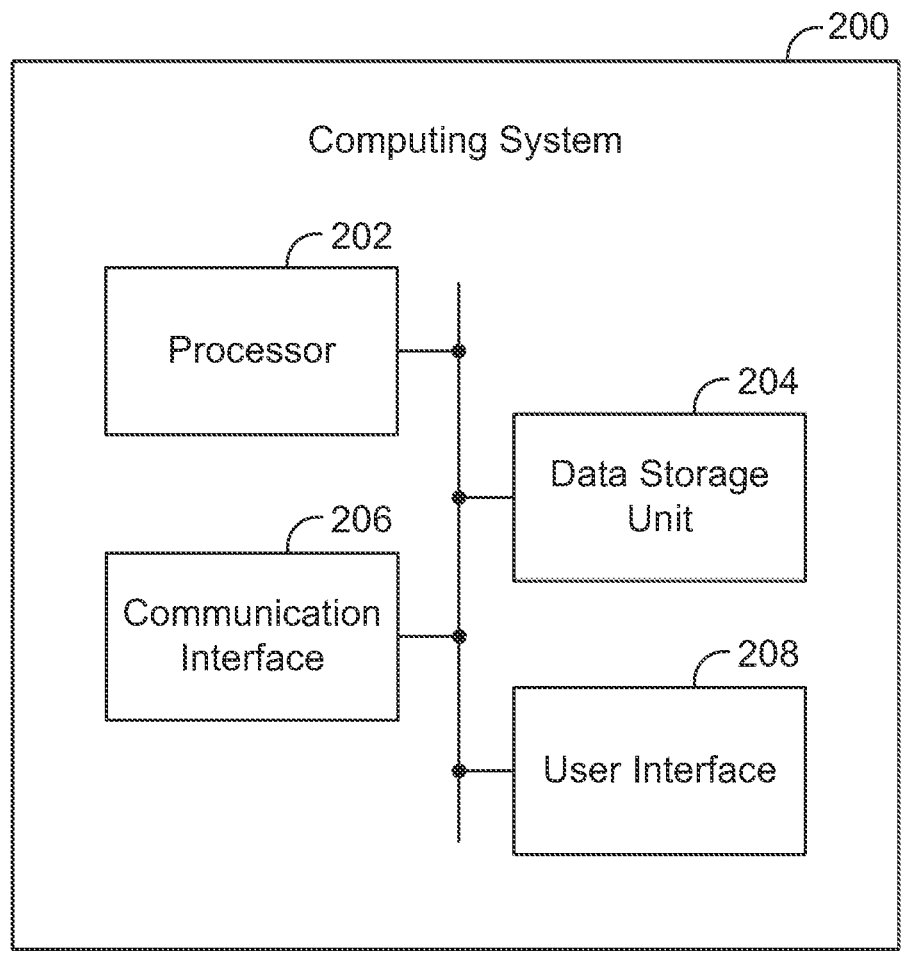
FIG. 2 is a simplified block diagram of an example computing system in which various described principles can be implemented.

FIG. 2 is a simplified block diagram of an example computing system 200. The computing system 200 can be configured to perform and/or can perform one or more operations, such as the operations described in this disclosure. The computing system 200 can include various components, such as a processor 202, a data-storage unit 204, a communication interface 206, and/or a user interface 208.

The processor 202 can be or include a general-purpose processor (e.g., a microprocessor) and/or a special-purpose processor (e.g., a digital signal processor). The processor 202 can execute program instructions included in the data-storage unit 204 as described below.

The data-storage unit 204 can be or include one or more volatile, non-volatile, removable, and/or non-removable storage components, such as magnetic, optical, and/or flash storage, and/or can be integrated in whole or in part with the processor 202. Further, the data-storage unit 204 can be or include a non-transitory computer-readable storage medium, having stored thereon program instructions (e.g., compiled or non-compiled program logic and/or machine code) that, upon execution by the processor 202, cause the computing system 200 and/or another computing system to perform one or more operations, such as the operations described in this disclosure. These program instructions can define, and/or be part of, a discrete software application.

In some instances, the computing system 200 can execute program instructions in response to receiving an input, such as an input received via the communication interface 206 and/or the user interface 208. The data-storage unit 204 can also store other data, such as any of the data described in this disclosure.

The communication interface 206 can allow the computing system 200 to connect with and/or communicate with another entity according to one or more protocols. Therefore, the computing system 200 can transmit data to, and/or receive data from, one or more other entities according to one or more protocols. In one example, the communication interface 206 can be or include a wired interface, such as an Ethernet interface or a High-Definition Multimedia Interface (HDMI). In another example, the communication interface 206 can be or include a wireless interface, such as a cellular or WI-FI interface.

The user interface 208 can allow for interaction between the computing system 200 and a user of the computing system 200. As such, the user interface 208 can be or include an input component such as a keyboard, a mouse, a remote controller, a microphone, and/or a touch-sensitive panel. The user interface 208 can also be or include an output component such as a display device (which, for example, can be combined with a touch-sensitive panel) and/or a sound speaker.

The computing system 200 can also include one or more connection mechanisms that connect various components within the computing system 200. For example, the computing system 200 can include the connection mechanisms represented by lines that connect components of the computing system 200, as shown in FIG. 2.

The computing system 200 can include one or more of the above-described components and can be configured or arranged in various ways. For example, the computing system 200 can be configured as a server and/or a client (or perhaps a cluster of servers and/or a cluster of clients) operating in one or more server-client type arrangements, for instance.

As noted above, the content-modification system 100 and/or components thereof can take the form of a computing system, such as the computing system 200. In some cases, some or all these entities can take the form of a more specific type of computing system. For instance, in the case of the content-presentation device 104, it can take the form of a desktop computer, a laptop, a tablet, a mobile phone, a television set, a set-top box, a television set with an integrated set-top box, a media dongle, or a television set with a media dongle connected to it, among other possibilities.

III. Example Operations

The content-modification system 100 and/or components thereof can be configured to perform and/or can perform one or more operations. Examples of these operations and related features will now be described.

As noted above, in practice, the content-modification system 100 is likely to include many instances of at least some of the described components. Likewise, in practice, it is likely that at least some of described operations will be performed many times (perhaps on a routine basis and/or in connection with additional instances of the described components).

A. Operations Related to the Content-Distribution System Transmitting Content and the Content-Presenting Device Receiving and Outputting Content For context, general operations and examples related to the content-distribution system 102 transmitting content and the content-presentation device 104 receiving and outputting content will now be described.

To begin, the content-distribution system 102 can transmit content (e.g., that it received from a content provider) to one or more entities such as the content-presentation device 104. Content can be or include audio content and/or video content, for example. In some examples, content can take the form of a linear sequence of content segments (e.g., program segments and advertisement segments) or a portion thereof. In the case of video content, a portion of the video content may be one or more frames, for example.

The content-distribution system 102 can transmit content on one or more channels (sometimes referred to as stations or feeds). As such, the content-distribution system 102 can be associated with a single channel content distributor or a multi-channel content distributor such as a multi-channel video program distributor (MVPD).

The content-distribution system 102 and its means of transmission of content on the channel to the content-presentation device 104 can take various forms. By way of example, the content-distribution system 102 can be or include a cable-television head-end that is associated with a cable-television provider and that transmits the content on the channel to the content-presentation device 104 through hybrid fiber/coaxial cable connections. As another example, the content-distribution system 102 can be or include a satellite-television head-end that is associated with a satellite-television provider and that transmits the content on the channel to the content-presentation device 104 through a satellite transmission. As yet another example, the content-distribution system 102 can be or include a television-broadcast station that is associated with a television-broadcast provider and that transmits the content on the channel through a terrestrial over-the-air interface to the content-presentation device 104. In these and other examples, the content-distribution system 102 can transmit the content in the form of an analog or digital broadcast stream representing the content.

The content-presentation device 104 can receive content from one or more entities, such as the content-distribution system 102. In one example, the content-presentation device 104 can select (e.g., by tuning to) a channel from among multiple available channels, perhaps based on input received via a user interface, such that the content-presentation device 104 can receive content on the selected channel.

In some examples, the content-distribution system 102 can transmit content to the content-presentation device 104, which the content-presentation device 104 can receive, and therefore the transmitted content and the received content can be the same. However, in other examples, they can be different, such as where the content-distribution system 102 transmits content to the content-presentation device 104, but the content-presentation device 104 does not receive the content and instead receives different content from a different content-distribution system.

The content-presentation device 104 can also output content for presentation. As noted above, the content-presentation device 104 can take various forms. In one example, in the case where the content-presentation device 104 is a television set (perhaps with an integrated set-top box and/or media dongle), outputting the content for presentation can involve the television set outputting the content via a user interface (e.g., a display device and/or a sound speaker), such that it can be presented to an end-user. As another example, in the case where the content-presentation device 104 is a set-top box or a media dongle, outputting the content for presentation can involve the set-top box or the media dongle outputting the content via a communication interface (e.g., an HDMI interface), such that it can be received by a television set and in turn output by the television set for presentation to an end-user.

As such, in various scenarios, the content-distribution system 102 can transmit content to the content-presentation device 104, which can receive and output the content for presentation to an end-user. In some situations, even though the content-presentation device 104 receives content from the content-distribution system 102, it can be desirable for the content-presentation device 104 to perform a content-modification operation so that the content-presentation device 104 can output for presentation alternative content instead of at least a portion of that received content.

For example, in the case where the content-presentation device 104 receives a linear sequence of content segments that includes a given advertisement segment positioned somewhere within the sequence, it can be desirable for the content-presentation device 104 to replace the given advertisement segment with a different advertisement segment that is perhaps more targeted to the end-user (i.e., more targeted to the end-user's interests, demographics, etc.). As another example, it can be desirable for the content-presentation device 104 to overlay on the given advertisement segment, overlay content that enhances the given advertisement segment in a way that is again perhaps more targeted to the end-user. The described content-modification system 100 can facilitate providing these and other related features.

As noted above, in one example, content can take the form of a linear sequence of content segments. As such, in one example, the content-distribution system 102 can transmit a linear sequence of content segments. This is referred to herein as a "transmission sequence." Likewise, the content-presentation device 104 can receive a linear sequence of content segments. This is referred to herein as a "receipt sequence." In line with the discussion above, the transmission sequence and the receipt sequence can be the same or they can be different.

Figure 3:
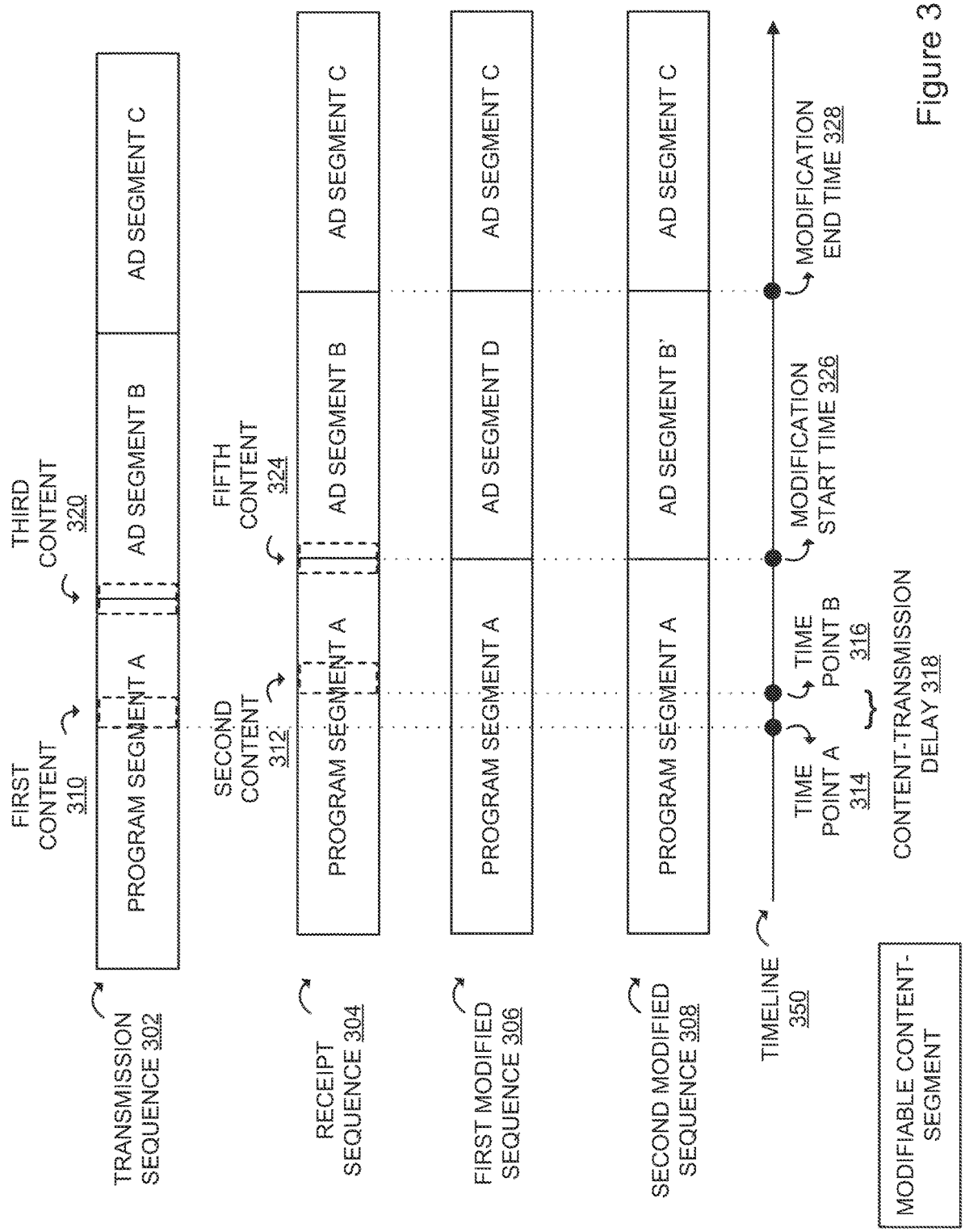
FIG. 3 is a diagram of example linear sequences of content and related concepts.

FIG. 3 illustrates some examples of these concepts. In one example, the transmission sequence is the TRANSMISSION SEQUENCE 302 shown in FIG. 3. As shown, the TRANSMISSION SEQUENCE 302 includes a PROGRAM SEGMENT A, followed by an AD SEGMENT B, followed by an AD SEGMENT C.

Likewise, in one example, the receipt sequence is the RECEIPT SEQUENCE 304 shown in FIG. 3. In this example, the content-distribution system 102 transmits the TRANSMISSION SEQUENCE 302 to the content-presentation device 104, which the content-presentation device 104 receives as the RECEIPT SEQUENCE 304, and therefore the TRANSMISSION SEQUENCE 302 and the RECEIPT SEQUENCE 304 are the same. As such, as shown, the RECEIPT SEQUENCE 304 also includes the PROGRAM SEGMENT A, followed by the AD SEGMENT B, followed by the AD SEGMENT C.

In FIG. 3, the transmission time of the TRANSMISSION SEQUENCE 302 and the receipt time of the RECEIPT SEQUENCE 304 are shown by way of their relationship to a TIMELINE 350. Notably, the transmission time and the receipt time are offset from each other due to a content-transmission delay, which is described in greater detail below.

As noted above, in some situations, even though the content-presentation device 104 receives content from the content-distribution system 102, it can be desirable for the content-presentation device 104 to perform a content-modification operation so that the content-presentation device 104 can output for presentation alternative content instead of at least a portion of that received content. For example, in the case where the content-presentation device 104 receives the receipt sequence, rather than outputting for presentation the receipt sequence, the content-presentation device 104 can output for presentation a modified version of the receipt sequence instead. This is referred to herein as a "modified sequence."

For example, in the case where the receipt sequence includes a given advertisement segment positioned somewhere within the receipt sequence, it can be desirable for the content-presentation device 104 to replace the given advertisement segment with a different advertisement segment that is perhaps more targeted to the end-user (i.e., more targeted to the end-user's interests, demographics, etc.), thereby resulting in a modified sequence that the content-presentation device 104 can output for presentation.

To illustrate this, in one example, the modified sequence is the FIRST MODIFIED SEQUENCE 306 shown in FIG. 3. As shown, the FIRST MODIFIED SEQUENCE 306 includes the PROGRAM SEGMENT A, followed by the AD SEGMENT D (which replaced the AD SEGMENT B), followed by the AD SEGMENT C.

As another example, it can be desirable for the content-presentation device 104 to overlay on the given advertisement segment, overlay content that enhances the given advertisement segment in a way that is again perhaps more targeted to the end-user, thereby resulting in a modified sequence that the content-presentation device 104 can output for presentation.

To illustrate this, in another example, the modified sequence is the SECOND MODIFIED SEQUENCE 308 shown in FIG. 3. As shown, the SECOND MODIFIED SEQUENCE 308 includes the PROGRAM SEGMENT A, followed by the AD SEGMENT B' (which is the AD SEGMENT B modified with overlay content), followed by the AD SEGMENT C.

Other portions of FIG. 3 will be described later in this disclosure as related concepts are introduced and described.

Moving on in view of the context provided above, FIGS. 4A, 4B, 4C, 4D, 4E, and 4F, collectively make up a table showing example time-periods and corresponding operations that can be performed in connection with the content-modification system 100. These and other related operations will now be described.

B. Operations Related to the Content-Distribution System Transmitting First Content on a Channel During a time-period T1, the content-distribution system 102 can transmit content on a channel to the content-presentation device 104. This content is referred to herein as "first content." In one example, the first content is the FIRST CONTENT 310 shown in FIG. 3.

During a time-period T2, the content-distribution system 102 can generate fingerprint data representing the first content. This fingerprint data is referred to herein as "first fingerprint data." The content-distribution system 102 can generate the first fingerprint data using any content fingerprinting process now known or later developed. By way of example, the content-distribution system 102 can generate the first fingerprint data by selecting multiple patches of a frame of video content and calculating a value for each of the selected multiple patches. In some instances, the values can include Haar-like features at different scales and in different locations of displayed regions of the frame of video content. Further, in some instances, the values can be derived from an integral image, which is a summed image where each pixel is a sum of values of the pixels above and to the left, as well as the current pixel. Using an integral image technique may increase the efficiency of the fingerprint generation.

The content-distribution system 102 can access the first content at various points within the content-distribution system 102. As one example, the content-distribution system 102 can access the first content after it is output by a distribution amplifier within the content-distribution system 102.

Also during the time-period T2, the content-distribution system 102 can generate metadata associated with the first content and/or the first fingerprint data. This metadata is referred to herein as "first metadata." In one example, the first metadata can be or include a transmission time-stamp, which represents a time-point at which the content-distribution system 102 transmitted the first content. The content-distribution system 102 can determine the transmission time-stamp in various ways, such as based on a time clock that is synchronized to a reference clock.

As another example, the first metadata can be or include a channel identifier, which identifies the channel on which the content-distribution system 102 is transmitting the first content. The content-distribution system 102 can determine the channel identifier in various ways such as based on mapping data that maps the content-distribution system 102 and/or physical inputs and/or outputs within the content-distribution system 102 to respective channel identifiers. In one example, in the case where the content-distribution system 102 transmits content A on channel A, content B on channel B, and content C on channel C, the mapping data can specify which of three different outputs (perhaps on three different distribution amplifiers) maps to which channel identifier, such that the content-distribution system 102 can determine the appropriate channel identifier for content of a given channel.

As another example, the first metadata can be or include SCTE-104 data, a watermark, or a similar type of metadata, any of which can themselves encode other metadata, such as a program identifier, an advertisement identifier (e.g., an industry standard coding identification (ISCI) key), a program genre, or another type of textual or numeric metadata, for instance.

The content-distribution system 102 can associate the first fingerprint data with the first metadata in various ways. For instance, in the case where the first fingerprint data includes multiple fingerprints with each fingerprint representing a corresponding frame of the first content, the content-distribution system 102 can associate each fingerprint with a corresponding transmission time-stamp and/or with other corresponding first metadata.

During a time-period T3, the content-distribution system 102 can transmit the first fingerprint data and the first metadata to the fingerprint-matching server 106. The content-distribution system 102 can transmit the first fingerprint data and the first metadata at a given interval. For example, every two seconds, the content-distribution system 102 can transmit the first fingerprint data and the first metadata that it generated during that most recent two-second time-period.

C. Operations Related to the Content-Presentation Device Receiving Second Content During a time-period T4, the content-presentation device 104 can receive content from the content-distribution system 102. This content is referred to herein as "second content." In one example, the second content is the SECOND CONTENT 312 shown in FIG. 3.

During a time-period T5, the content-presentation device 104 can generate fingerprint data representing the second content. This fingerprint data is referred to herein as "second fingerprint data." The content-presentation device 104 can generate the second fingerprint data using any content fingerprinting process now known or later developed. The content-presentation device 104 can generate the second fingerprint data at various rates, such as at the rate of one fingerprint per frame of the second content. The second fingerprint data can be or include some or all of these generated fingerprints.

The content-presentation device 104 can access the second content at various points within the content-presentation device 104. As one example, the content-presentation device 104 can access the second content as it is being received by an input buffer (e.g., an HDMI buffer) of the content-presentation device 104. In another configuration, the content-presentation device 104 can access the second content as it is being received by a display buffer of the content-presentation device 104. In this configuration, the second content can therefore be content that the content-presentation device 104 not only receives, but also outputs for presentation.

Also during the time-period T5, the content-presentation device 104 can generate metadata associated with the second content and/or the second fingerprint data. This metadata is referred to herein as "second metadata." As one example, the second metadata can be or include a receipt time-stamp, which represents a time-point at which the content-presentation device 104 received the second content. The content-presentation device 104 can determine the receipt time-stamp in various ways, such as based on a time clock that is synchronized to a reference clock. As noted above, the content-presentation device 104 can access the second content at various points within the content-presentation device 104. In one example, the point at which the second content is accessed can be considered the "receipt" point for purposes of determining the receipt time-stamp.

In practice, while the first metadata is likely to be or include a channel identifier, the second metadata is likely to not be nor include a channel identifier.

The content-presentation device 104 can associate the second fingerprint data with the second metadata in various ways. For instance, where the second fingerprint data includes multiple fingerprints with each fingerprint representing a corresponding frame of second content, the content-presentation device 104 can associate each second fingerprint with a corresponding receipt time-stamp and/or other corresponding metadata.

During a time-period T6, the content-presentation device 104 can transmit the second fingerprint data and the second metadata to the fingerprint-matching server 106. The content-presentation device 104 can transmit the second fingerprint data and the second metadata at a given interval. For example, every two seconds, the content-presentation device 104 can transmit the second fingerprint data and the second metadata that it generated during that most recent two-second time-period.

D. Operations Related to Identifying a Channel on Which the Content-Presentation Device is Receiving the Second Content During a time-period T7, the fingerprint-matching server 106 can receive the first fingerprint data and the first metadata from the content-distribution system 102. As noted above, the first fingerprint data represents the first content transmitted by the content-distribution system 102 on the channel. As noted above, the first metadata can, and for the purposes of this described example does, identify the channel. In this way, the first content can be considered as content being transmitted on an identified channel.

During a time-period T8, the fingerprint-matching server 106 can receive the second fingerprint data and the second metadata from the content-presentation device 104. As noted above, the second fingerprint data represents the second content received by the content-presentation device 104. However, as noted above, the associated metadata may not, and for the purposes of this described example does not, identify the channel. In this way, the second content can be considered as content being received on an unidentified channel.

During a time-period T9, the fingerprint-matching server 106 can compare the first fingerprint data and the second fingerprint data to determine whether there is a match. In this disclosure, this type of match attempt, namely a match attempt between (i) reference fingerprint data representing content being transmitted on an identified channel and (ii) query fingerprint data representing content being received on an unidentified channel, is referred to herein as a "cold match attempt."

During a time-period T10, based on the comparing, the fingerprint-matching server 106 can detect a match between the first fingerprint data and the second fingerprint data. The fingerprint-matching server 106 can compare and/or detect a match between fingerprint data using any content fingerprint comparing and matching technique now known or later developed. By way of example, the first fingerprint data may include a first group of fingerprints, and the second fingerprint data may include a second group of fingerprints. The fingerprint-matching server 106 can determine that the first group of fingerprints match the second group of fingerprints upon determining that a similarity between each of the query fingerprints and each of the respective reference fingerprints satisfies a predetermined threshold associated with a Tanimoto distance measurement, a Manhattan distance measurement, and/or other distance measurements associated with matching images or other visual-based content.

To effectively compare the first fingerprint data and the second fingerprint data, the fingerprint-matching server 106 may need to account for a content-transmission delay. For context, in the case where the content-distribution system 102 transmits a given frame of content on a given channel at a time-point A, for various reasons, the content-presentation device 104 may not receive that frame until a time-point B that is later (e.g., ten seconds later) than the time-point A. This type of delay is referred to herein as a "content-transmission delay."

In one example, the time-point A, the time-point B, and the content-transmission delay can be the TIME-POINT A 314, the TIME-POINT B 316, and the CONTENT-TRANSMISSION DELAY 318, respectively, shown FIG. 3. Note that FIG. 3 is for illustration purposes and is not necessarily to scale at least with respect to time. In practice, the actual amount of content-transmission delay may be different from the amount shown.

To help the fingerprint-matching server 106 effectively compare the first fingerprint data with the second fingerprint data, the fingerprint-matching server 106 may need to account for such a content-transmission delay. In one example, the fingerprint-matching server 106 can do this by comparing the first fingerprint data that it receives at a receipt time-point with the second fingerprint data that it receives during a time-period defined by a starting time-point and an ending time-point. The starting time-point can be the receipt time-point plus an offset representing an anticipated content-transmission delay (e.g., ten seconds), minus a tolerance a time-period (e.g., two seconds). The ending time-point can be the receipt time-point plus the offset (e.g., ten seconds), plus the tolerance a time-period (e.g., two seconds). As such, in one example where the anticipated content-transmission delay is 10 seconds, the fingerprint-matching server 106 can compare first fingerprint data that it receives at a receipt time-point with second fingerprint data that it receives during a time-period between (i) the receipt time-point plus eight seconds and (ii) receipt time-point plus twelve seconds.

In some cases, the fingerprint-matching server 106 can determine a content-transmission delay, which it can use to select an appropriate offset for use in determining the starting and ending time-points, as described above. The fingerprint-matching server 106 can determine the content-transmission delay in various ways. For example, after the fingerprint-matching server 106 detects a match based on a cold match attempt, the fingerprint-matching server 106 can determine the content-transmission delay as a difference between the corresponding transmission time-stamp (of the first metadata) and the corresponding receipt time-stamp (of the second metadata), for example. Notably, the content-transmission delay can vary from channel to channel.

During a time-period T11, based on the detected match, the fingerprint-matching server 106 can identify the channel on which the second content is being received by the content-presentation device 104. In one example, the fingerprint-matching server 106 can identify the channel based on the channel identifier metadata associated with the first fingerprint data used to detect the match.

Notably, in practice, since there are likely to be multiple potential channels on which the content-presentation device 104 is receiving the second content, the fingerprint-matching server 106 is likely to compare the second fingerprint data with multiple instances of first fingerprint data (each representing a different respective instance of first content on a different respective channel), to determine which of those multiple instances matches the second fingerprint data.

Also, in some cases, the fingerprint-matching server 106 can detect a match between the second fingerprint data and each of multiple instances of first fingerprint data (each representing a different respective instance of first content on a different respective channel). This is referred to herein as a "multimatch scenario" and can occur for various reasons. For example, this can occur when the content-distribution system 102 is transmitting the same or similar content on more than one channel at or about the same time. In this scenario, the fingerprint-matching server 106 can perform additional operations to identity, from among the multiple channels associated with the multimatch scenario, on which specific channel the content-presentation device 104 is receiving the second content. The fingerprint-matching server 106 can do this using any channel multimatch disambiguation technique now known or later developed. By way of example, responsive to determining that a fingerprint of the second fingerprint data matches multiple fingerprints of the first fingerprint data, the fingerprint-matching server 106 can (i) identify a fingerprint feature that differs as between the multiple fingerprints of the first fingerprint data and (ii) determine that a fingerprint of the second fingerprint data matches just one of the multiple fingerprints as to the identified fingerprint feature. Identifying the fingerprint feature can involve (i) referring to data that indicates a region of a frame that is channel specific to determine a region that is channel specific and (ii) identifying as the fingerprint feature a fingerprint feature corresponding with the determined region. The determined region can include a video frame edge or a region where channel identification is presented, for instance.

E. Operations Related to Determining Historical Content Consumption Data

During a time-period T12, the fingerprint-matching server 106 can generate metadata associated with the identified channel. For example, the metadata can be or include a channel identification time-stamp. The fingerprint-matching server 106 can determine the channel identification time-stamp in various ways, such as based on a time clock that is synchronized to a reference clock. In another example, the metadata can be or include a device identifier that identifies the content-presentation device 104 that is receiving content on the identified channel. The fingerprint-matching server 106 can determine the device identifier in various ways, such as by receiving it from the content-presentation device 104. In another example, the fingerprint-matching server 106 can receive data (e.g., device registration data) from the content-presentation device 104 and can use mapping data to map the received data to determine the device identifier.

During a time-period T13, the fingerprint-matching server 106 can transmit an indication of the identified channel and the associated metadata to the data-management system 110.

During a time-period T14, the data-management system 110 can receive the indication of the identified channel and the associated metadata from the fingerprint-matching server 106.

The data-management system 110 can use the received indication of the identified channel and the associated metadata, perhaps with other data, to determine when the content-presentation device 104 has received content on the identified channel, what specific content the content-presentation device 104 has received, etc. This type of data is referred to herein as "historical content consumption data."

As such, during a time-period T15, the data-management system 110 can determine historical content consumption data associated with the content-presentation device 104.

F. Operations Related to the Content-Distribution System Transmitting Third Content As noted above, the fingerprint-matching server 106 can identify the channel on which the content-presentation device 104 is receiving the second content.

During a time-period T16, the content-distribution system 102 can transmit content on the identified channel to the content-presentation device 104. This content is referred to herein as "third content." In one example, the third content is the THIRD CONTENT 320 shown in FIG. 3. In practice, the content-distribution system 102 is likely to transmit the third content shortly after (e.g., immediately after or a few seconds or minutes after) transmitting the first content.

During a time-period T17, the content-distribution system 102 can generate fingerprint data representing the third content. This fingerprint data is referred to herein as "third fingerprint data."

Also during the time-period T17, the content-distribution system 102 can generate metadata associated with the third content and/or the third fingerprint data. This metadata is referred to herein as "third metadata." The content-distribution system 102 can also associate the third fingerprint data with the third metadata.

During a time-period T18, the content-distribution system 102 can transmit the third fingerprint data and the third metadata to the fingerprint-matching server 106.

The content-distribution system 102 can transmit the third content, generate the third fingerprint data, generate the third metadata, associate the third fingerprint data with the third metadata, and transmit the third fingerprint data and the third metadata in various ways, such as ways that are the same as or similar to those described above in connection with transmitting the first content, generating the first fingerprint data, generating the first metadata, associating the first fingerprint data with the first metadata, and transmitting the first fingerprint data and the first metadata.

G. Operations Related to the Content-Management System Receiving a Modifiable Content-Segment During a time-period T19, the content-management system 108 can receive content in the form of a content segment that has been identified as a candidate to be modified. This content is referred to herein as a "modifiable content-segment" or "fourth content." In one example, the modifiable content-segment is the MODIFIABLE CONTENT-SEGMENT shown in FIG. 3.

The modifiable content-segment can take various forms. For example, the modifiable content-segment can be an advertisement segment (e.g., a commercial) or a program segment. As such, in one example, the modifiable content-segment can be an advertisement segment that has been identified as a candidate to be modified, perhaps by way of being replaced with a different advertisement segment, and/or by way of having content overlaid thereon.

In one example, a user, perhaps associated with the content-distribution system 102, can facilitate uploading the modifiable content-segment to the content-management system 108, such that the content-management system 108 can receive it in this way.

During a time-period T20, the content-management system 108 can generate fingerprint data representing the modifiable content-segment. This fingerprint data is referred to herein as "fourth fingerprint data." The content-management system 108 can generate the fourth fingerprint data using any fingerprint generation technique now known or later developed. The content-management system 108 can generate the fourth fingerprint data at a given rate, such as at the rate of one fingerprint per frame of the fourth content. The fourth fingerprint data can be or include some or all of these generated fingerprints.

Also during the time-period T20, the content-management system 108 can generate metadata associated with the modifiable content-segment and/or the fourth fingerprint data. This metadata is referred to herein as "fourth metadata." As one example, the fourth metadata can be or include a duration of the modifiable content-segment. The content-management system 108 can determine the duration in various ways, such as based on the fingerprint generation process. For example, in the case where the content-management system 108 generating the fourth fingerprint data involves generating one fingerprint per frame, where the modifiable content-segment has a frame rate of 30 frames per second, and where the fingerprinting process results in 300 fingerprints being generated, the content-management system 108 can deduce that the modifiable content-segment has a duration of ten seconds. The metadata can also be or include other information about the modifiable content-segment, such as a content segment identifier, a title, and/or specifics about permissible ways in which the modifiable content-segment can be modified, etc.

During a time-period T21, the content-management system 108 can transmit the fourth fingerprint data and the fourth metadata to the fingerprint-matching server 106.

In practice, the content-management system 108 is likely to receive many modifiable content-segments. In such situations, the content-management system 108 can perform one or more of the operations described above, as appropriate for each of the many received modifiable content-segments. As such, the content-management system 108 can transmit many instances of fourth fingerprint data, each corresponding with a different respective modifiable content-segment, to the fingerprint-matching server 106.

H. Operations Related to the Fingerprint-Matching Server Identifying an Upcoming Content Modification Opportunity on the Identified Channel During a time-period T22, the fingerprint-matching server 106 can receive the third fingerprint data and the third metadata from the content-distribution system 102. As noted above, the third fingerprint data represents the third content transmitted by the content-distribution system 102 on the identified channel.

During a time-period T23, the fingerprint-matching server 106 can receive the fourth fingerprint data and the fourth metadata from the content-management system 108. As noted above, the fourth fingerprint data represents the modifiable content-segment.

During a time-period T24, the fingerprint-matching server 106 can compare at least a portion of the third fingerprint data with at least a portion of the fourth fingerprint data to determine whether there is a match.

During a time-period T25, based on the comparing, the fingerprint-matching server 106 can detect a match between the at least a portion of the third fingerprint data and the at least a portion of the fourth fingerprint data. The fingerprint-matching server 106 can compare and/or detect a match between fingerprint data using any content fingerprint comparing and matching process now known or later developed.

During a time-period T26, based on the detected match, the fingerprint-matching server 106 can determine that at least a portion of the modifiable content-segment is included within the third content, and therefore can identify an upcoming content-modification opportunity on the identified channel. For example, the fingerprint-matching server 106 can determine that at least a beginning portion of the MODIFIABLE CONTENT-SEGMENT is included within the THIRD CONTENT 320, as shown in FIG. 3, and therefore can identify an upcoming content-modification opportunity.

As noted above, the fingerprint-matching server 106 can receive third metadata, which can be the same as or similar to the first metadata. As such, the third metadata can be or include a transmission time-stamp and/or a channel identifier, for example. However, the third metadata can also be or include a position of at least a portion of the modifiable content-segment within the third content. In one example, the metadata can specify this using a starting frame marker and an ending frame marker, each corresponding with a respective frame of the third content. The fingerprint-matching server 106 can determine the starting frame marker and the ending frame marker based on the matching.

Notably, in practice, since there are likely to be multiple potential modifiable content-segments where portions thereof could be included within the third content, the fingerprint-matching server 106 is likely to compare at least a portion of the third fingerprint data with at least a portion of multiple instances of fourth fingerprint data (each representing a different respective instance of a modifiable content-segment), to determine which of those multiple instances of the fourth fingerprint data has a portion that matches the at least a portion of the third fingerprint data.

I. Operations Related to Preparing the Content-Presentation Device to Perform a Content-Modification Operation in Connection with the Identified Upcoming Content Modification Opportunity During a time-period T27, based on the detected match, the fingerprint-matching server 106 can transmit the third fingerprint data and the third metadata to the content-presentation device 104 data to facilitate preparing the content-presentation device 104 to perform a content-modification operation in connection with the identified upcoming content-modification opportunity.

During a time-period T28, the content-presentation device 104 can receive the third fingerprint data and the third metadata from the fingerprint-matching server 106.

During a time-period T29, the content-presentation device 104 can receive content on the identified channel. This content is referred to herein as "fifth content." In one example, the fifth content is the FIFTH CONTENT 324 shown in FIG. 3.

For various reasons (e.g., due to a transmission delay associated with transmitting fingerprint data and metadata being shorter that the content-transmission delay), the content-presentation device 104 can receive the third fingerprint data and the third metadata from the fingerprint-matching server 106 before receiving the fifth content from the content-distribution system 102. In this way, the content-presentation device 104 can receive fingerprint data representing content that the content-presentation device 104 is expecting to receive shortly thereafter, and that the content-presentation device should actually receive shortly thereafter unless an interruption event (e.g., a channel-change event) occurs.

In practice, similar to how the content-distribution system 102 is likely to transmit the third content shortly after (e.g., immediately after or a few seconds or minutes after) transmitting the first content, the content-presentation device 104 is likely to receive the fifth content shortly after (e.g., immediately after or a few seconds or minutes after) receiving the second content.

During a time-period T30, the content-presentation device 104 can output for presentation at least a portion of the fifth content. For example, referring to FIG. 3, the content-presentation device can output for presentation the portion of the FIFTH CONTENT 324 that is the end portion of the PROGRAM SEGMENT A.

As noted above, in some situations, even though the content-presentation device 104 receives content from the content-distribution system 102, it can be desirable for the content-presentation device 104 to perform a content-modification operation so that the content-presentation device 104 can output for presentation alternative content instead of at least a portion of the received content.

As such, even though the content-presentation device 104 receives the fifth content and outputs for presentation at least a portion of the fifth content, it can be desirable for the content-presentation device 104 to perform a content-modification operation so that the content-presentation device 104 can also output for presentation alternative content instead of at least another portion (e.g., the remaining portion) of the fifth content. For example, referring to FIG. 3, it can be desirable for the content-presentation device 104 to replace at least a portion of the AD SEGMENT B with at least a portion of a different advertisement segment that is perhaps more targeted to the end-user. As another example, it can be desirable for the content-presentation device 104 to overlay on at least a portion of the AD SEGMENT B, overlay content that enhances at least a portion of the AD SEGMENT B in a way that is again perhaps more targeted to the end-user.

During a time-period T31, the content-presentation device 104 can generate fingerprint data representing the fifth content. This fingerprint data is referred to herein as "fifth fingerprint data." The content-presentation device 104 can generate the fifth fingerprint data using any content fingerprinting process now known or later developed. The content-presentation device 104 can generate the fifth fingerprint data at various rates, such as at the rate of one fingerprint per frame of the fifth content. The fifth fingerprint data can be or include some or all of these generated fingerprints.

Also during the time-period T31, the content-presentation device 104 can generate metadata associated with the fifth content and/or the fifth fingerprint data. This metadata is referred to herein as "fifth metadata."

The content-presentation device 104 can receive the fifth content, generate the fifth fingerprint data, generate the fifth metadata, associate the fifth fingerprint data with the fifth metadata in various ways, such as ways that are the same as or similar to those described above in connection with receiving the second content, generating the second fingerprint data, generating the second metadata, and associating the second fingerprint data with the second metadata.

As noted above, the content-presentation device 104 can receive the third fingerprint data from the fingerprint-matching server 106 and can generate the fifth fingerprint data.

During a time-period T32, the content-presentation device 104 can compare the third fingerprint data and the fifth fingerprint data to determine whether there is a match.

During a time-period T33, based on the comparing, the content-presentation device 104 can detect a match between the third fingerprint data and the fifth fingerprint data. In this disclosure, this type of match attempt, namely a match attempt between (i) reference fingerprint data representing content transmitted by the content-distribution system 102 on an identified channel (at least based on the most recent channel identification analysis), and (ii) query fingerprint data representing content being received by the content-presentation device 104 on the same identified channel, is referred to herein as a "hot match attempt." The content-presentation device 104 can compare and/or detect a match between fingerprint data using any content fingerprint comparing and matching process now known or later developed.

During a time-period T34, based on the detected match, the content-presentation device 104 can determine a time-point at which the identified upcoming modification opportunity starts. This is referred to herein as the "modification start-time." In one example, the modification start-time is the MODIFICATION START-TIME 326 as shown FIG. 3.

In one example, the content-presentation device 104 can determine the modification start-time by starting with the transmission time-stamp associated with the starting frame marker (which, as described above, can be or be included in the third metadata) and adding the content-transmission delay to that transmission time-stamp, to arrive at the modification start-time.

As another example, the content-presentation device 104 can determine the modification start-time by first establishing a synchronous lock between the third content, the third fingerprint data, and/or the third metadata on the one hand, and the fifth content, the fifth fingerprint data, and/or the fifth metadata, on the other hand. The content-presentation device 104 can establish the synchronous lock using any synchronous lock technique now known or later developed. By way of example, the fingerprint-matching server 106 can transmit, to the content-presentation device 104, at least a portion of the third fingerprint data, and the content-presentation device 104 can increase the frame rate at which the content-presentation device 104 generates the fifth fingerprint data. The content-presentation device 104 can then use the third and fifth fingerprint data—namely, the time-stamps at which the third and fifth fingerprint data were generated—as a basis to establish synchronous lock (e.g., a time offset) between (i) true time defined along a timeline within the content being transmitted by the content-distribution system 102 and (ii) client time defined according to a clock of the content-presentation device 104. As another example, the fingerprint-matching server 106 can establish synchronous lock as described above and then inform the content-presentation device 104.

The content-presentation device 104 can then determine the modification start-time by determining a time-period between (i) a current receipt time-stamp associated with a first portion of the fifth content that the content-presentation device 104 is currently receiving and (ii) based on the synchronous lock, an anticipated receipt time-stamp associated with a second portion of the fifth content that is the start of the modifiable content-segment, and then adding the determined time-period to the current receipt time-stamp, to arrive at the modification start-time.

Also during the time-period T34, based on the detected match, the content-presentation device 104 can determine a time-point at which the identified upcoming modification opportunity ends. This is referred to herein as the "modification end-time." In one example, the modification end-time is the MODIFICATION END-TIME 328 as shown FIG. 3.

In one example, the content-presentation device 104 can determine the modification end-time by starting with the modification start-time and adding the duration of the modifiable content-segment (which, as described above, can be or be included in the fourth metadata) to the modification start-time, to arrive at the modification end-time.

Notably, if the content-presentation device 104 performs a hot match attempt and does not detect a match, the content-presentation device 104 can determine that the content-presentation device 104 is no longer receiving content on the most recently identified channel. In response, the content-presentation device 104 can repeat one or more of the operations described above so that the fingerprint-matching server 106 can perform another cold match attempt, to attempt to identify the channel again.

During a time-period T35, the content-presentation device 104 can transmit a request for content for use in connection with performing the content-modification operation, to the content-management system 108. This content is referred to herein as "supplemental content." In one example, the content-presentation device 104 can transmit the request before the modification start-time (e.g., ten seconds before). In some cases, the request can include selection criteria for the supplemental content, which the content-presentation device 104 can determine based on the third metadata that the content-presentation device 104 receives from the fingerprint-matching server 106, for instance.

For example, the selection criteria can specify a requested type of content (e.g., a replacement content segment or overlay content), duration (e.g., 15 seconds, 30 seconds, or 60 seconds), aspect ratio (e.g., 4:3 or 16:9), and/or resolution (e.g., 720p or 1080p).

During a time-period T36, the content-management system 108 can receive the request and use it as a basis to select supplemental content from among multiple supplemental content items that are available for selection. In some cases, the content-management system 108 can receive and consider various data to help inform which supplemental content to select. For example, the content-management system 108 can receive historical content consumption data for the content-presentation device 104 from the data-management system 110 and/or the content-management system 108 can receive demographic data from a demographic data provider. The content-management system 108 can then use at least the received historical content consumption data and/or the received demographic data as a basis to select the supplemental content.

The content-management system 108 can cause the selected supplemental content to be transmitted to the content-presentation device 104. In one example, the content-management system 108 can do this by communicating with a supplemental-content delivery system 112 that can host the supplemental content. The supplemental-content delivery system 112 can take various forms and can include various components, such as a content distribution network (CDN).

During a time-period T37, the content-management system 108 can transmit a request for a link (e.g., a Uniform Resource Identifier (URI) or a Uniform Resource Locator (URL)) pointing to the hosted supplemental content, to the supplemental-content delivery system 112.

During a time-period T38, the supplemental-content delivery system 112 can receive and respond to the request for the link by transmitting the requested link to the content-management system 108.

During a time-period T39, the content-management system 108 can then in turn transmit the link to the content-presentation device 104.

During a time-period T40, the content-presentation device 104 can receive the link, which it can use to retrieve the supplemental content from the supplemental-content delivery system 112, such that the content-presentation device 104 can use the retrieved supplemental content in connection with performing the content-modification operation. In one example, the content-presentation device 104 can retrieve the supplemental content and store the supplemental content in a data-storage unit of the content-presentation device 104.

As such, in some examples, the content-presentation device 104 can receive the modifiable content-segment from one source (e.g., the content-distribution system 102), and the supplemental content from another source (e.g., the supplemental-content delivery system 112). These segments can be transmitted to, and received by, the content-presentation device 104 in different ways. For example, the content-distribution system 102 can transmit, and the content-presentation device 104 can receive, the modifiable content-segment as a broadcast stream transmission, whereas the supplemental-content delivery system 112 can transmit, and the content-presentation device 104 can receive, the supplemental content as an over-the-top (OTT) transmission. In this context, in one example, the content-distribution system 102 can receive the modifiable content-segment via one communication interface (e.g., an HDMI interface), and the content-presentation device 104 can receive the supplemental content via a different communication interface (e.g., an Ethernet or WI-FI interface).

J. Operations Related to the Content-Presentation Device Performing a Content-Modification Operation At a time-period T41, the content-presentation device 104 can perform the content-modification operation. The content-presentation device 104 can do this in various ways, perhaps depending on the type of content-modification operation to be performed.

In one example, the content-presentation device 104 performing a content-modification operation can involve the content-presentation device 104 modifying the modifiable content-segment by replacing it with supplemental content. This is referred to herein as a "content-replacement operation." For example, in this scenario, the content-presentation device 104 can receive a linear sequence of content segments that includes the modifiable content-segment and the associated metadata, and can also receive the supplemental content segment, as described above. The content-presentation device 104 can output for presentation the sequence of content segments up until the modification start-time (which corresponds to the start of the modifiable content-segment), at which time the content-presentation device 104 can switch to outputting for presentation the supplemental content instead. Then, at the modification end-time (which corresponds to the end of the modifiable content-segment), the content-presentation device 104 can switch back to outputting for presentation the content that follows in the linear sequence of content segments (or perhaps to other content, such as additional supplemental content that is replacing another modifiable content-segment).

In one example, the operation of the content-presentation device 104 switching from outputting the sequence of content segments to outputting the supplemental content can involve using various buffers of the content-presentation device 104. For example, this can involve the content-presentation device 104 switching from using first data in a first input buffer where the sequence of content segments is being received to using second data in a second input buffer where the supplemental content is being received, to populate a display buffer.

As such, according to one example as illustrated in FIG. 3, by performing a content replacement operation, the content-presentation device 104 can replace the AD SEGMENT B with the AD SEGMENT D. As a result, rather than outputting for presentation the RECEIPT SEQUENCE 304, the content-presentation device can instead output for presentation the FIRST MODIFIED SEQUENCE 306.

In another example, the content-presentation device 104 performing a content-modification operation can involve the content-presentation device 104 modifying a modifiable content-segment by overlaying on the modifiable content-segment, overlay content (referred to herein as a "content overlay operation"). For example, in this scenario, the content-presentation device 104 can again receive a linear sequence of content segments that includes the modifiable content-segment and the associated metadata, and the content-presentation device 104 can also receive the supplemental content, as described above.

The content-presentation device 104 can then output for presentation the modifiable content-segment as it ordinarily would, except that starting at the modification start-time, the content-presentation device 104 can start overlaying the supplemental content on the modifiable content-segment. The content-presentation device 104 can continue overlaying the supplemental content until the modification end-time. In this way, the content-presentation device 104 can overlay the supplemental content during at least some temporal portion of the modifiable content-segment.

In one example, the operation of the content-presentation device 104 overlaying supplemental content on the modifiable content-segment can involve using various buffers of the content-presentation device 104. For example, this can involve the content-presentation device 104 using a portion of first data in a first input buffer where the sequence of content segments is being received together with second data in a second input buffer where the supplemental content is being received, for the purposes of populating a display buffer. In this way, the content-presentation device can combine relevant portions of the modifiable content-segment (i.e., all portions except those representing region where the supplemental content is to be overlaid) together with the supplemental content to be used as an overlay, to create the desired modifiable content-segment plus the supplemental content overlaid thereon.

As such, according to one example as illustrated in FIG. 3, by performing a content overlay operation, the content-presentation device 104 can overlay supplemental content on the AD SEGMENT B, thereby modifying it to AD SEGMENT B'. As a result, rather than outputting for presentation the RECEIPT SEQUENCE 304, the content-presentation device can instead output for presentation the SECOND MODIFIED SEQUENCE 308.

In some examples, the content-presentation device 104 can perform an entirety of a content-modification operation (e.g., a replacement or overlay action, as described above) while tuned to the channel on which the RECEIPT SEQUENCE 304 is received, unless an intervening event occurs that might cause the content-modification operation (or the output of the resulting content) to be stopped, such as a channel change or a powering down of the content-presentation device 104 and/or associated display device. Thus, the FIRST MODIFIED SEQUENCE 306 or the SECOND MODIFIED SEQUENCE 308 can be output on the same channel on which the content-presentation device 104 is tuned—that is, the channel on which the modifiable content-segment is received and on which the content-modification opportunity was identified.

K. Tracking and Reporting Operation-Related Data

To help facilitate performance of various operations such as the content-presentation device 104 performing a content-modification operation and to help allow for the tracking and reporting of such operations, the content-modification system 100 and/or components thereof can track and report various operation-related data at various times and in various ways.

As just a few illustrative examples, responsive to certain operations being performed, such as those described herein, the fingerprint-matching server 106, the content-presentation device 104, and/or another entity can generate, store, and/or transmit messages that indicate (i) that a modifiable content-segment has been identified, (ii) that a channel has been identified/confirmed (perhaps based on a match detected as a result of a cold or hot match attempt), (iii) that an upcoming content-modification opportunity on the identified channel has been identified, (iv) that supplemental content has been requested, (v) that supplemental content has been received, (vi), that a content-modification operation has started, (vii) that a content-modification operation has ended, and/or (viii) that a scheduled content-modification operation was aborted and/or not performed for any given reason. In some cases, these messages can include other metadata related to these operations. For example, the metadata can specify relevant timing information, device identifiers, channel identifiers, content segment identifiers, etc.

L. Watermark-Based Techniques

Although this disclosure has described the content-modification system 100 using fingerprint-based technology to perform various operations and to provide various features, in some examples, the content-modification system 100 can use watermark-based techniques instead of, or in addition to, fingerprint-based techniques, to perform these and other operations and to provide these and other features.

For example, as an alternative to the fingerprint-based technique described above in which the fingerprint-matching server 106 identifies the channel on which the second content is being received by the content-presentation device 104, the content-distribution system 102 or another entity can insert a channel identifier in the form of a watermark into the second content, such that the fingerprint-matching server 106, the content-presentation device 104, or another entity can extract the channel identifier and use it to identify the channel on which the second content is being received by the content-presentation device 104.

In this context, the content-modification system 100 can employ any watermark technique now known or later developed.

M. Operations Related to Advertisement Reconciliation

The present disclosure provides an improved content-modification system that autonomously reconciles an advertising campaign in the event that a content misidentification has caused an advertisement segment to be partially replaced.

Although the following operations are described primarily in the context of replacing advertisement segments, it should be understood that the operations can also apply with respect to replacing other types of content segments that are part of a linear sequence of content that is transmitted by a content-distribution system, such as program segments (e.g., television programs).

As indicated above, a first content-presentation device (e.g., content-presentation device 104) can be scheduled to replace an advertisement segment that the first content-presentation device receives from the content-distribution system 102. This scheduled content-replacement operation can be due to the fingerprint-matching server 106 having misidentified the advertisement segment.

As such, while the first content-presentation device is outputting a replacement advertisement segment in place of the advertisement segment, the fingerprint-matching server 106 can determine that the advertisement segment is not an expected modifiable advertisement segment. That is, the fingerprint-matching server 106 can detect that the underlying advertisement segment that the first content-presentation device is currently replacing is not the modifiable advertisement segment that the fingerprint-matching server 106 was expecting.

To facilitate this, for example, the fingerprint-matching server 106 can receive, from the first content-presentation device, query fingerprint data representing the advertisement segment and detect a mismatch between the query fingerprint data and reference fingerprint data representing the expected modifiable advertisement segment. As another example, the fingerprint-matching server 106 can receive, from the first content-presentation device, a notification of a local mismatch that the first content-presentation device detected. Other examples are possible as well.

In response to determining that the advertisement segment is not the expected modifiable advertisement segment, the fingerprint-matching server 106 can determine whether the advertisement segment is ineligible for replacement.

To facilitate this, for instance, the fingerprint-matching server 106 can have local memory that stores, or can have access to remote memory (e.g., on a separate server) that stores, a rule that, in accordance with an advertising campaign or other agreement, identifies the advertisement segment as an advertisement segment that is ineligible for replacement. For example, the advertisement segment might be associated with a particular brand or entity. In this scenario, the rule could be a rule created in accordance with an advertising campaign in which the advertiser has requested that the content-modification system 100 not replace any advertisement segments that are associated with the particular brand or entity.

The rule might also specify one or more conditions that must be met in order for the advertisement to be eligible for replacement. For example, the rule could be a rule created in accordance with an advertising campaign in which the advertiser has requested that the content-modification system 100 not replace the advertisement segment until at least a threshold number of impressions of the advertisement segment is reached.

In some examples, the fingerprint-matching server 106 can also store or otherwise have access to a list of advertisement segment identifiers corresponding to advertisement segments that are ineligible for replacement according to the rule. The fingerprint-matching server 106 can refer to the list and determine whether an identifier of the advertisement segment is on the list and has thus been flagged as ineligible for replacement. Further, in the event that the replacement eligibility of the advertisement segment is subject to a threshold number of impressions, the fingerprint-matching server 106 can determine the current number of impressions and determine whether the threshold has been met.

In response to determining that the advertisement segment is ineligible for replacement, the fingerprint-matching server 106 can cause at least one content-presentation device to perform, at a subsequent content-replacement opportunity, a corrective content-replacement operation in which the at least one content-presentation device outputs the advertisement segment in place of a subsequent modifiable advertisement segment that the at least one content-presentation device is scheduled to receive. In other words, the fingerprint-matching server 106 can reconcile the fact that the advertisement segment was partially replaced by helping to ensure that at least one content-presentation device will present the advertisement segment in the future.

The act of causing the at least one content-presentation device to perform the corrective content-replacement operation can involve any one or more of the operations described herein that are involved in preparing a content-presentation device for performing a content-replacement operation. For instance, the fingerprint-matching server 106 can transmit to the at least one content-presentation device an instruction to perform the corrective content-replacement operation at a specific modification start-time of the subsequent content-replacement opportunity. Additionally or alternatively, the fingerprint-matching server 106 can arrange for the advertisement segment to be delivered (e.g., via the supplemental-content delivery system 112) to the at least one content-presentation device.

Additional operations involved in causing the at least one content-presentation device to perform the corrective content-replacement operation will be described below in more detail.

In some examples, the fingerprint-matching server 106 can cause the first content-presentation device to perform the corrective content-replacement operation.

In other examples, the fingerprint-matching server 106 can cause a second content-presentation device, different from the first content-presentation device, to perform the corrective content-replacement operation. This might occur in various situations. For instance, the fingerprint-matching server 106 can determine that the first content-presentation device does not have an upcoming content-replacement opportunity that is within a predefined time-window (e.g., within the next two hours) or is otherwise unable to perform a corrective content-replacement operation.

As such, to select the second content-presentation device, the fingerprint-matching server 106 can use historical content consumption data associated with the first content-presentation device. In particular, the fingerprint-matching server 106 can use the historical content consumption data to determine demographic data expected to represent an end-user of the first content-presentation device. The fingerprint-matching server 106 can then select, from a group of content-presentation devices, the second content-presentation device based at least in part on the second content-presentation device having demographic data that matches at least a portion of the determined demographic data for the first content-presentation device.

In some cases, the fingerprint-matching server 106 can additionally or alternatively use demographic data associated with the advertisement segment. In particular, the fingerprint-matching server 106 can refer to metadata associated with the advertisement segment that specifies target demographic data for the advertisement segment. The fingerprint-matching server 106 can then select, from a group of content-presentation devices, the second content-presentation device based at least in part on the second content-presentation device having demographic data that matches at least a portion of the target demographic data for the advertisement segment.

By using demographic data as described above, the fingerprint-matching server 106 can help ensure that the corrective content-replacement operation is performed by a content-presentation device and associated end-user to which the advertisement segment is targeted.

In still other examples, the fingerprint-matching server 106 can cause a plurality of content-presentation devices, including the first content-presentation device and/or the second content-presentation device, to perform the corrective content-replacement operation. For instance, this might occur when the advertisement segment has been at least partially replaced multiple times and thus multiple corrective content-replacement operations are needed. To facilitate this, the fingerprint-matching server 106 can keep track of (e.g., using a counter) how many times the advertisement segment has been at least partially replaced and later initiate a batch reconciliation in which the fingerprint-matching server 106 causes the plurality of content-presentation devices to each perform the corrective content-replacement operation. In some cases, demographic data can be used in the same manner as discussed above as at least one basis for selecting which content-presentation devices should perform the corrective content-replacement operations.

Before the at least one content-presentation device performs the corrective content-replacement operation, the fingerprint-matching server 106 can select the subsequent content-replacement opportunity based on the subsequent content-replacement opportunity having a modification start-time that is within a predefined time-window relative to a particular time-point, such as: the modification start-time of the content-replacement operation; a start-time at which when the broadcast schedule data indicated that the advertisement segment was scheduled to air; or a time-point at which the fingerprint-matching server 106 determined that the advertisement segment was not the expected modifiable advertisement segment. For example, the fingerprint-matching server 106 can select the subsequent content-replacement opportunity based on the subsequent content-replacement opportunity having a modification start-time that is within an hour of the modification start-time at which the first content-presentation device began replacing the advertisement segment.

In some cases, it can be desirable to have the at least one content-presentation device perform the corrective content-replacement operation as soon as possible after the determination is made that the fingerprint-matching server 106 misidentified the advertisement segment. Accordingly, the fingerprint-matching server 106 can identify a next possible content-replacement opportunity and cause the at least one content-presentation device to perform the corrective content-replacement operation at that opportunity. In such scenarios, the fingerprint-matching server 106 can select the first content-presentation device or the second content-presentation device to perform the corrective content-replacement operation based on which of the devices has the earliest next possible content-replacement opportunity.

To identify the next possible content-replacement opportunity for a given content-presentation device, or to identify any content-replacement opportunity, for that matter, the fingerprint-matching server 106 can perform one or more of the operations described above, such as those at time-periods T22-T26.

The fingerprint-matching server 106 can consider additional or alternate factors as well when determining which content-presentation device(s) to have perform the corrective content-replacement operation(s) and when, such as a content-presentation device's bandwidth, download speed, and/or content-transmission delay on the channel to which the content-presentation device is currently tuned.

In some situations, the first content-presentation device can index (e.g., store, in memory, a copy of, or a link to) the advertisement segment in response to the determination that the advertisement segment is ineligible for replacement. Then, if the first content-presentation device is instructed to perform the corrective content-replacement operation, the first content-presentation device can efficiently retrieve the advertisement segment before the subsequent content-replacement opportunity. Alternatively, the first content-presentation device and/or other content-presentation device that will be performing the corrective content-replacement operation may already have the advertisement segment indexed or may already otherwise have access to the advertisement segment, and thus might not need to index it at the time the determination that the advertisement segment is ineligible for replacement is made.

In situations where the at least one content-presentation device does not already have the advertisement segment indexed, or perhaps in other situations, the fingerprint-matching server 106 can create the advertisement from video data received from the content-distribution system (e.g., the content feed from a television headend) from which the first content-presentation device received the advertisement segment. The video data can include a linear sequence of content segments that includes the advertisement segment. As such, the fingerprint-matching server 106 can extract a portion of the video data that corresponds to the advertisement segment.

To facilitate this, for instance, the fingerprint-matching server 106 can use an Ad-ID or other content identifier to identify the advertisement segment within the video data. Once the fingerprint-matching server 106 has extracted the portion of the video data that corresponds to the advertisement segment, the fingerprint-matching server 106 can convert the extracted portion of the video data to the advertisement segment. Alternatively, if the fingerprint-matching server 106 has an Ad-ID for a first content segment that immediately precedes the advertisement segment and an Ad-ID for a second content segment that immediately follows the advertisement segment, the fingerprint-matching server 106 can cut out a portion of the video data between the end-time of the first content segment and a start-time of the second content segment.

In response to converting the extracted portion of the video data to the advertisement segment, the fingerprint-matching server 106 can cause the advertisement segment to be transmitted to the at least one content-presentation device, such as by providing the at least one content-presentation device with a link to retrieve the advertisement segment.

The fingerprint-matching server 106 can perform other remedial actions as well as part of the above-described process, such as to correct any mistaken advertisement impressions records that might have resulted from the misidentification. Consider an example scenario in which the advertisement segment was at least partially replaced due to the misidentification. In that scenario, the fingerprint-matching server 106 might have initially transmitted, to another computing system (e.g., a server that is not part of the content-modification system 100) associated with an advertiser or other content provider that provides the advertisement segment, a report including impressions data that indicates that the advertisement segment was replaced, and thus that a corresponding impression of the advertisement segment did not occur.

However, upon the at least one content-presentation device performing the corrective content-replacement operation, the fingerprint-matching server 106 can be configured to transmit, to the other computing system, a subsequent report correcting the impressions data to indicate that the advertisement segment was not replaced. The impressions data can take the form of a number of impressions, tracked and recorded by the content-modification system 100, for instance.

In other scenarios, the fingerprint-matching server 106 might not transmit a report with impressions data until after the corrective content-replacement operation has been performed. Thus, the corrective content-replacement operation can be performed and then the fingerprint-matching server 106 can transmit a report indicating that the advertisement segment was not replaced.

In some embodiments, in response to determining that the advertisement segment is ineligible for replacement, the fingerprint-matching server 106 can additionally cause the first content-presentation device to complete an entirety of the performance of the content-replacement operation. That is, instead of the first content-presentation device aborting the content-replacement operation partway through and thus causing an undesirable user experience, the fingerprint-matching server 106 can have the first content-presentation device continue the replacement until the entirety of the replacement advertisement segment has been output. Thus, desirable user experience is maintained and the content-replacement operation is not abruptly ended. Then, as described above, the fingerprint-matching server 106 can have the at least one content-presentation device perform the corrective content-replacement operation at the subsequent content-replacement opportunity, and perhaps additionally transmit a report to the advertiser indicating that the advertisement segment was not replaced.

Figure 5:
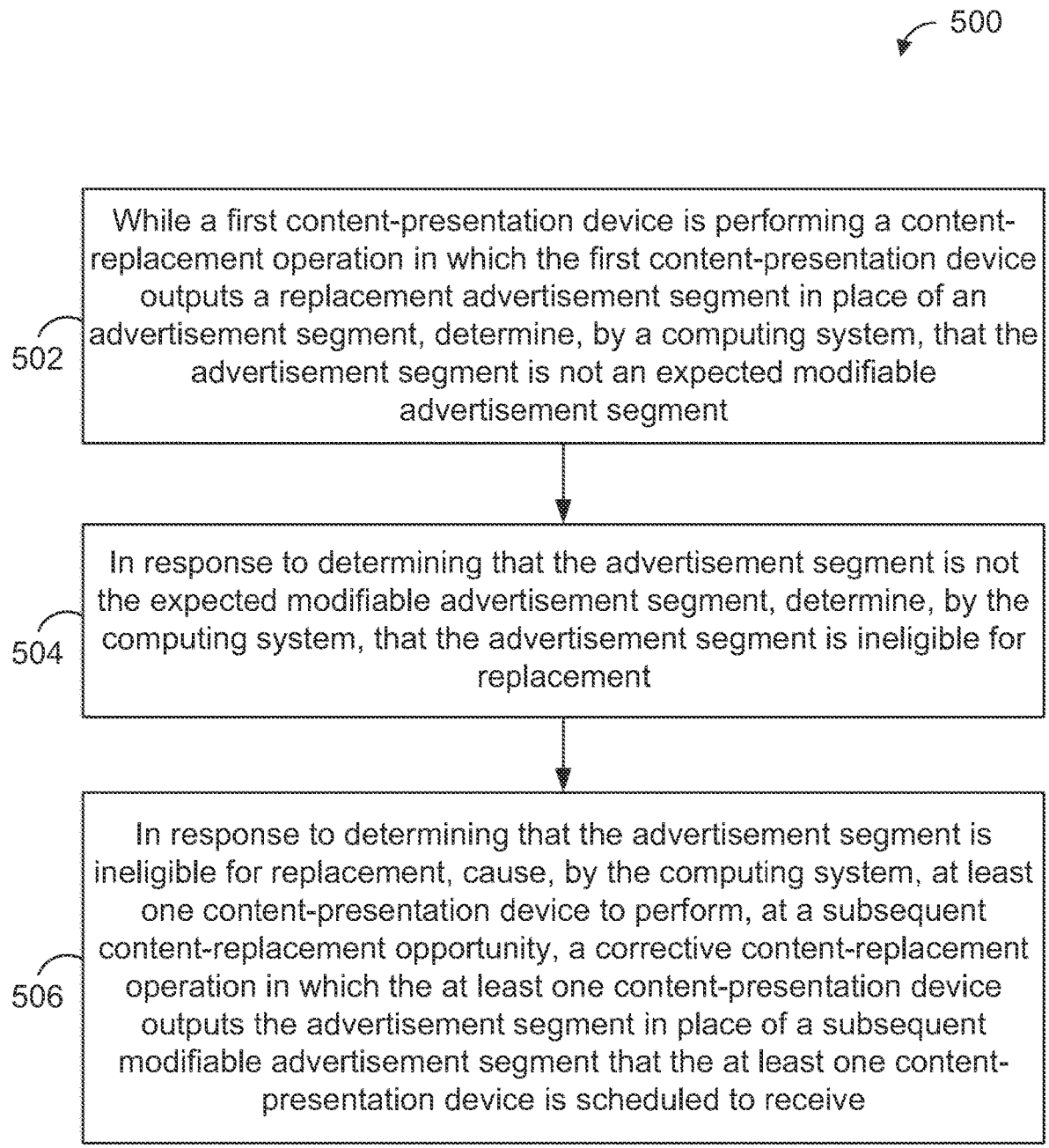
FIG. 5 is a flow chart of an example method.

FIG. 5 is a flow chart of an example method 500. At block 502, the method 500 includes while a first content-presentation device is performing a content-replacement operation in which the first content-presentation device outputs a replacement advertisement segment in place of an advertisement segment, determining, by a computing system, that the advertisement segment is not an expected modifiable advertisement segment.

At block 504, the method 500 includes in response to determining that the advertisement segment is not the expected modifiable advertisement segment, determining, by the computing system, that the advertisement segment is ineligible for replacement.

At block 506, the method 500 includes in response to determining that the advertisement segment is ineligible for replacement, causing, by the computing system, at least one content-presentation device to perform, at a subsequent content-replacement opportunity, a corrective content-replacement operation in which the at least one content-presentation device outputs the advertisement segment in place of a subsequent modifiable advertisement segment that the at least one content-presentation device is scheduled to receive.

In some embodiments, the method 500 can also include in response to determining that the advertisement segment is ineligible for replacement, causing, by the computing system, the first content-presentation device to complete an entirety of the performance of the content-replacement operation.

In some embodiments, the act of causing the at least one content-presentation devices to perform the corrective content-replacement operation at the subsequent content-replacement opportunity can involve causing the first content-presentation device to perform the corrective content-replacement operation at the subsequent content-replacement opportunity.

In some embodiments, the act of causing the at least one content-presentation device to perform the corrective content-replacement operation at the subsequent content-replacement opportunity can involve causing a second content-presentation device, different from the first content-presentation device, to perform the corrective content-replacement operation at the subsequent content-replacement opportunity. In such embodiments, the method 500 can also include using, by the computing system, historical content consumption data associated with the first content-presentation device to determine demographic data expected to represent an end-user of the first content-presentation device, and selecting, by the computing system, from a group of content-presentation devices, the second content-presentation device based at least in part on the second content-presentation device having demographic data that matches at least a portion of the determined demographic data for the first content-presentation device. Further, the act of causing the second content-presentation device to perform the corrective content-replacement operation at the subsequent content-replacement opportunity can involve causing the selected second content-presentation device to perform the corrective content-replacement operation at the subsequent content-replacement opportunity.

In some embodiments, the act of causing the at least one content-presentation devices to perform the corrective content-replacement operation at the subsequent content-replacement opportunity can involve causing the at least one content-presentation device to perform the corrective content-replacement operation at a next possible content-replacement opportunity.

In some embodiments, the method 500 can also include before the at least one content-presentation device performs the corrective content-replacement operation, selecting, by the computing system, the subsequent content-replacement opportunity based on the subsequent content-replacement opportunity having a modification start-time that is within a predefined time-window relative to the modification start-time of the content-replacement operation. In such embodiments, the act of causing the at least one content-presentation devices to perform the corrective content-replacement operation at the subsequent content-replacement opportunity can involve causing the at least one content-presentation device to perform the corrective content-replacement operation at the selected subsequent content-replacement opportunity.

In some embodiments, the method 500 can also include before the at least one content-presentation device performs the corrective content-replacement operation: using, by the computing system, historical content consumption data associated with the at least one content-presentation device to determine demographic data expected to represent at least one end-user of the at least one content-presentation device, and selecting, by the computing system, the subsequent content-replacement opportunity based at least in part on the determined demographic data. In such embodiments, the act of causing the at least one content-presentation devices to perform the corrective content-replacement operation at the subsequent content-replacement opportunity can involve causing the at least one content-presentation device to perform the corrective content-replacement operation at the selected subsequent content-replacement opportunity.

In some embodiments, the method 500 can also include transmitting, by the computing system, to another computing system associated with an advertiser that provides the advertisement segment, a report indicating that the advertisement segment was not replaced.

In some embodiments, the act of causing the at least one content-presentation device to perform the corrective content-replacement operation can involve receiving, from a content-distribution system from which the first content-presentation device received the advertisement segment, video data comprising a linear sequence of content segments, extracting a portion of the video data that corresponds to the advertisement segment, converting the extracted portion of the video data to the advertisement segment, and in response to converting the extracted portion of the video data to the advertisement segment, causing the advertisement segment to be transmitted to the at least one content-presentation device.

IV. Example Variations

Although the examples and features described above have been described in connection with specific entities and specific operations, in practice, there are likely to be many instances of these entities and many instances of these operations being performed, perhaps contemporaneously or simultaneously, on a large-scale basis. Indeed, in practice, the content-modification system 100 is likely to include many content-distribution systems (each potentially transmitting content on many channels) and many content-presentation devices, with some or all of the described operations being performed on a routine and repeating basis in connection with some or all of these entities.

In addition, although some of the operations described in this disclosure have been described as being performed by a particular entity, the operations can be performed by any entity, such as the other entities described in this disclosure. Further, although the operations have been recited in a particular order and/or in connection with example temporal language, the operations need not be performed in the order recited and need not be performed in accordance with any particular temporal restrictions. However, in some instances, it can be desired to perform one or more of the operations in the order recited, in another order, and/or in a manner where at least some of the operations are performed contemporaneously/simultaneously. Likewise, in some instances, it can be desired to perform one or more of the operations in accordance with one more or the recited temporal restrictions or with other timing restrictions. Further, each of the described operations can be performed responsive to performance of one or more of the other described operations. Also, not all of the operations need to be performed to achieve one or more of the benefits provided by the disclosure, and therefore not all of the operations are required.

Although certain variations have been described in connection with one or more examples of this disclosure, these variations can also be applied to some or all of the other examples of this disclosure as well and therefore aspects of this disclosure can be combined and/or arranged in many ways. The examples described in this disclosure were selected at least in part because they help explain the practical application of the various described features.

Also, although select examples of this disclosure have been described, alterations and permutations of these examples will be apparent to those of ordinary skill in the art. Other changes, substitutions, and/or alterations are also possible without departing from the invention in its broader aspects as set forth in the following claims.

What is claimed is:

1. A method comprising:
    while a first content-presentation device is performing a content-replacement operation in which the first content-presentation device outputs a replacement advertisement segment in place of an advertisement segment, determining, by a computing system, that the advertisement segment is not an expected modifiable advertisement segment,
    in response to determining that the advertisement segment is not the expected modifiable advertisement segment, determining that the advertisement segment is ineligible for replacement; and
    in response to determining that the advertisement segment is ineligible for replacement, selecting from a group of content-presentation devices, at least one content-presentation device to perform, at a subsequent content-replacement opportunity, a corrective content-replacement operation in which the at least one content-presentation device outputs the advertisement segment in place of a subsequent modifiable advertisement segment that the at least one content-presentation device is scheduled to receive, wherein the at least one content-presentation device is selected based at least in part on demographic data associated with the first content-presentation device.

2. The method of claim 1, further comprising:
    in response to determining that the advertisement segment is ineligible for replacement, causing the first content-presentation device to complete an entirety of the performing of the content-replacement operation.

3. The method of claim 1, further comprising:
    causing the at least one content-presentation device to perform the corrective content-replacement operation at the subsequent content-replacement opportunity, wherein the corrective content-replacement operation is performed prior to the at least one content-presentation device outputting the subsequent modifiable advertisement segment.

4. The method of claim 1, wherein the selecting from the group of content-presentation devices comprises selecting a second content-presentation device, different from the first content-presentation device, to perform the corrective content-replacement operation at the subsequent content-replacement opportunity.

5. The method of claim 1, further comprising:
    using historical content consumption data associated with the first content-presentation device to determine demographic data expected to represent an end-user of the first content-presentation device; and
    selecting from the group of content-presentation devices, a second content-presentation device based at least in part on the second content-presentation device having demographic data that matches at least a portion of the determined demographic data for the first content-presentation device.

6. The method of claim 1, further comprising:
    receiving metadata associated with the advertisement segment that specifies target demographic data for the advertisement segment; and
    selecting from the group of content-presentation devices, a second content-presentation device based at least in part on the second content-presentation device having demographic data that matches at least a portion of the target demographic data for the advertisement segment.

7. The method of claim 1, further comprising:
    determining a plurality of times that the advertisement segment has been at least partially replaced; and
    selecting from the group of content-presentation devices, the at least one content-presentation device to perform, at a subsequent content-replacement opportunity, the corrective content-replacement operation for the plurality of times.

8. A computing system comprising:
    at least one processor; and
    a non-transitory computer-readable storage medium, having stored thereon program instructions that, upon execution by the at least one processor, cause performance of operations comprising:
    while a first content-presentation device is performing a content-replacement operation in which the first content-presentation device outputs a replacement advertisement segment in place of an advertisement segment, determining that the advertisement segment is not an expected modifiable advertisement segment;
    in response to determining that the advertisement segment is not the expected modifiable advertisement segment, determining that the advertisement segment is ineligible for replacement; and
    in response to determining that the advertisement segment is ineligible for replacement, selecting from a group of content-presentation devices, at least one content-presentation device to perform, at a subsequent content-replacement opportunity, a corrective content-replacement operation in which the at least one content-presentation device outputs the advertisement segment in place of a subsequent modifiable advertisement segment that the at least one content-presentation device is scheduled to receive, wherein the at least one content-presentation device is selected based at least in part on demographic data associated with the first content-presentation device.

9. The computing system of claim 8, the operations further comprising:
    in response to determining that the advertisement segment is ineligible for replacement, causing the first content-presentation device to complete an entirety of the performing of the content-replacement operation.

10. The computing system of claim 8, the operations further comprising:

causing the at least one content-presentation device to perform the corrective content-replacement operation at the subsequent content-replacement opportunity, wherein the corrective content-replacement operation is performed prior to the at least one content-presentation device outputting the subsequent modifiable advertisement segment.

11. The computing system of claim 8, wherein the selecting from the group of content-presentation devices comprises selecting a second content-presentation device, different from the first content-presentation device, to perform the corrective content-replacement operation at the subsequent content-replacement opportunity.

12. The computing system of claim 8, the operations further comprising:

using historical content consumption data associated with the first content-presentation device to determine demographic data expected to represent an end-user of the first content-presentation device; and selecting from the group of content-presentation devices, a second content-presentation device based at least in part on the second content-presentation device having demographic data that matches at least a portion of the determined demographic data for the first content-presentation device.

13. The computing system of claim 8, the operations further comprising:

receiving metadata associated with the advertisement segment that specifies target demographic data for the advertisement segment; and selecting from the group of content-presentation devices, a second content-presentation device based at least in part on the second content-presentation device having demographic data that matches at least a portion of the target demographic data for the advertisement segment.

14. The computing system of claim 8, the operations further comprising:

determining a plurality of times that the advertisement segment has been at least partially replaced; and selecting from the group of content-presentation devices, the at least one content-presentation device to perform, at a subsequent content-replacement opportunity, the corrective content-replacement operation for the plurality of times.

15. A non-transitory computer-readable storage medium, having stored thereon program instructions that, upon execution by at least one processor, cause performance of operations comprising:

while a first content-presentation device is performing a content-replacement operation in which the first content-presentation device outputs a replacement advertisement segment in place of an advertisement segment, determining that the advertisement segment is not an expected modifiable advertisement segment;

in response to determining that the advertisement segment is not the expected modifiable advertisement segment, determining that the advertisement segment is ineligible for replacement; and in response to determining that the advertisement segment is ineligible for replacement, selecting from a group of content-presentation devices, at least one content-presentation device to perform, at a subsequent content-replacement opportunity, a corrective content-replacement operation in which the at least one content-presentation device outputs the advertisement segment in place of a subsequent modifiable advertisement segment that the at least one content-presentation device is scheduled to receive, wherein the at least one content-presentation device is selected based at least in part on demographic data associated with the first content-presentation device.

16. The non-transitory computer-readable storage medium of claim 15, the operations further comprising:

in response to determining that the advertisement segment is ineligible for replacement, causing the first content-presentation device to complete an entirety of the performing of the content-replacement operation.

17. The non-transitory computer-readable storage medium of claim 15, the operations further comprising:

causing the at least one content-presentation device to perform the corrective content-replacement operation at the subsequent content-replacement opportunity, wherein the corrective content-replacement operation is performed prior to the at least one content-presentation device outputting the subsequent modifiable advertisement segment.

18. The non-transitory computer-readable storage medium of claim 15, wherein the selecting from the group of content-presentation devices comprises selecting a second content-presentation device, different from the first content-presentation device, to perform the corrective content-replacement operation at the subsequent content-replacement opportunity.

19. The non-transitory computer-readable storage medium of claim 15, the operations further comprising:

using historical content consumption data associated with the first content-presentation device to determine demographic data expected to represent an end-user of the first content-presentation device; and selecting from the group of content-presentation devices, a second content-presentation device based at least in part on the second content-presentation device having demographic data that matches at least a portion of the determined demographic data for the first content-presentation device.

20. The non-transitory computer-readable storage medium of claim 15, the operations further comprising:

receiving metadata associated with the advertisement segment that specifies target demographic data for the advertisement segment; and selecting from the group of content-presentation devices, a second content-presentation device based at least in part on the second content-presentation device having demographic data that matches at least a portion of the target demographic data for the advertisement segment.

* * * * *